Sept. 24, 1968 G. A. GARRY 3,403,289

DISTORTION CORRECTION SYSTEM FOR FLYING SPOT SCANNERS

Filed Feb. 18, 1966 2 Sheets-Sheet 1

INVENTOR
GERALD A. GARRY

BY Donald F Voss
ATTORNEY

Sept. 24, 1968 G. A. GARRY 3,403,289

DISTORTION CORRECTION SYSTEM FOR FLYING SPOT SCANNERS

Filed Feb. 18, 1966 2 Sheets-Sheet 2

United States Patent Office 3,403,289

Patented Sept. 24, 1968

3,403,289

DISTORTION CORRECTION SYSTEM FOR FLYING SPOT SCANNERS

Gerald A. Garry, Rochester, N.Y., assignor to International Business Machines Corporation, Armonk, N.Y., a corporation of New York Filed Feb. 18, 1966, Ser. No. 528,570

7 Claims. (Cl. 315—24)

This invention relates to apparatus for providing correction or compensation of distortion in cathode ray tubes or flying spot scanners and more particularly to distortion correction apparatus for flying spot scanning systems wherein both large and small deflection signals of different frequencies are applied to effect deflection of the beam.

The type of distortion to be corrected is defined in the art as pincushion and barrel distortion. The prior art systems provide a single distortion correction system for both the large and small deflection signals. This is not particularly desirable where the small deflection signals are at a very high frequency and at relatively low power and the large deflection signals are occurring at low frequency and at relatively high power. This typically occurs in character recognition machines utilizing a flying spot scanner. The large deflection signals function to position the beam to a line or field of characters to be scanned. However, the characters are scanned at high frequency while the beam is first vertically deflected in a first vertical scan of the character and then deflected to fly back on a diagonal to be in position for a second vertical scan. This action is repeated until all characters in a field are scanned. The beam is then positioned to a new field or line of characters by adjusting or changing the magnitude and/or direction of the large deflection signals. Since the large deflection signals are of one frequency and the small deflection signals are of another, the band width, signal to noise, gain stability and dynamic range requirements are different. Therefore, in this invention, both macro and micro distortion correction circuits are provided. The macro correction function is essentially cubic and the micro correction function can be taken as the first derivative of the macro correction function.

In addition to gaining precision by not putting the small deflection signals through the distortion correction circuitry for the large deflection signals, it is possible to have separate deflection drivers and deflection yokes. Further, it is possible to make the micro corrections at the ramp generators for generating the small deflection signals. This eliminates the requirement for analog multiplication. Of course, it is not necessary to make the micro correction at the ramp generator for generating the small deflection signals. Thus, this distortion correction system is particularly advantageous where separate ramp generators are used for generating the large and small deflection signals.

Accordingly, a principal object of this invention is to provide improved distortion correction apparatus for flying spots scanning systems.

Another very important object of the invention is to provide distortion correction apparatus for flying spot scanning systems which includes macro and micro correction circuits.

A further very important object of the invention is to provide distortion correction apparatus for flying spot scanning systems which have separate deflection drivers and deflection yokes for large and small deflection signals.

A more specific object of the invention is to provide distortion correction apparatus for flying spot scanning systems having large and small ramp generators which provides for distortion correction within the small ramp generator.

The foregoing and other objects, features and advantages of the invention will be apparent from the following more particular description of a preferred embodiment of the invention, as illustrated in the accompanying drawings.

Figure 1:
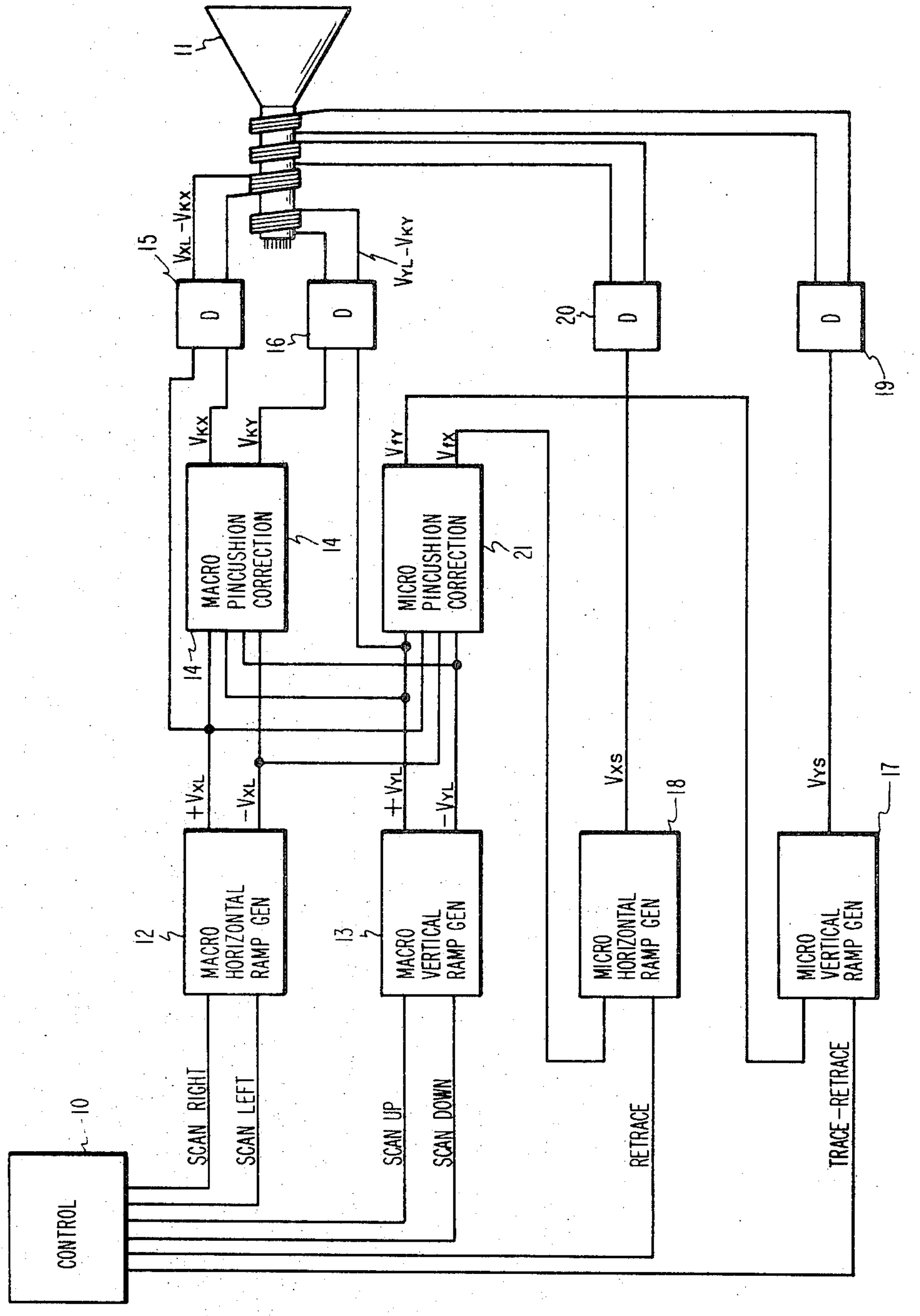
FIG. 1 is a schematic block diagram illustrating the invention.

With reference to the drawings and particularly to FIG. 1, the invention is shown by way of example as including control 10 which generates the scanning control signals scan right, scan left, scan up, scan down, trace-retrace and retrace. Normally control 10 would be part of the format control circuitry within a character recognition machine. Of course, it could be any control circuit for developing the commands to position the beam to discrete locations relative to the face of the cathode ray tube 11 and perform raster scanning at these positions.

The digital control lines scan right and scan left command the macro horizontal ramp generator 12 to produce positive and negative sawtooth deflection signals. Further, the output of ramp generator 12 has both polarities, that is, the $+V_{XL}$ can be either positive or negative and the $-V_{XL}$ is always the reverse of $+V_{XL}$. Similarly macro vertical ramp generator 13 produces positive and negative sawtooth deflection signals in response to the scan up and scan down commands from control 10.

The large deflection signals $V_{XL}$ and $V_{YL}$ deflect the beam to the discrete locations on the face of the cathode ray tube 11. However, due to pincushion distortion, in a magnetically deflected cathode ray tube, pincushion correction is required and this as accomplished by feeding the outputs from macro horizontal and vertical ramp generators 12 and 13 to inputs of macro pincushion correction circuit 14. The macro pincushion correction circuit 14 which can be of the type well known in the art such as described in Patent 2,831,145, dated Apr. 15, 1958, develops correction voltages $-V_{KX}$ and $-V_{KY}$ which are applied to inputs of deflection yoke drivers 15 and 16 respectively. The correction voltages $-V_{KX}$ and $-V_{KY}$ subtract from the deflection voltages $V_{XL}$ and $V_{YL}$ respectively, which are also applied to drivers 15 and 16 respectively. The correction voltages $V_{KX}$ and $V_{KY}$ are represented by the following formulae:

$$V_{KX}=\frac{K^2}{2}(V_{XL}^3+V_{XL}V_{YL}^2)$$

$$V_{KY}=\frac{K^2}{2}(V_{XL}V_{YL}^2+V_{YL}^3)$$

where $K$=a constant.

In this particular example, the beam, once grossly positioned, is deflected in a series of small vertical raster scans. To accomplish this, control 10 provides a trace-retrace command to micro vertical ramp generator 17 and a retrace command to micro horizontal ramp generator 18 in addition to the commands applied to generators 12 and 13. The trace-retrace command causes the micro vertical ramp generator to generate a sawtooth signal to first vertically deflect the beam upward at one rate during trace time and then vertically downward at another rate during retrace time. During retrace time, the micro horizontal ramp generator 18 is also operative to develop a small horizontal deflection signal. The combined action of the signals from generators 17 and 18 during retrace time causes the beam to move downwardly at an angle so as to be in position to permit a small second vertical scan during the next trace time.

The trace and retrace signals are provided at relatively high frequencies. For example, the trace signal for certain character recognition applications has a duration of approximately 35 microseconds and the retrace signal has duration of approximately 5 microseconds. The duration of the scan right, scan left, scan up and scan down signals is much longer than the combined duration of the trace and retrace signals. For example, it usually takes between 16 and 20 vertical scans to scan a character. Hence, even if only one character were scanned in a field, a frequency of the trace and retrace signals would be between 16 and 20 times as great as the other command signals.

Although it is possible to add the outputs of the micro vertical ramp and micro horizontal ramp generators 17 and 18 to the inputs of drivers 16 and 15 respectively, the outputs of generators 17 and 18 are shown as being connected to inputs of drivers 19 and 20 respectively. This permits the use of separate deflection coils for the micro deflection signals. The pincushion correction signals $V_{fY}$ and $V_{fX}$ necessary for correcting distortion caused by the magnetic deflection in response to the micro vertical and horizontal deflection signals are generated by the micro pincushion correction circuit 21. The micro pincushion correction circuit 21 has inputs from the outputs of the macro horizontal and vertical ramp generators 12 and 13. The micro pincushion correction circuit 21 which is shown in detail in FIG. 2 develops the following correction voltages:

$$V_{fX}=3V_{XL}^2+V_{YL}^2$$
$$V_{fY}=V_{XL}^2+3V_{YL}^2$$

The outputs $V_{fY}$ and $V_{fX}$ are connected to inputs of ramp generators 17 and 18 respectively. Micro vertical ramp generators 17 and 18 develop the outputs $V_{YS}$ and $V_{XS}$ respectively.

Figure 2:
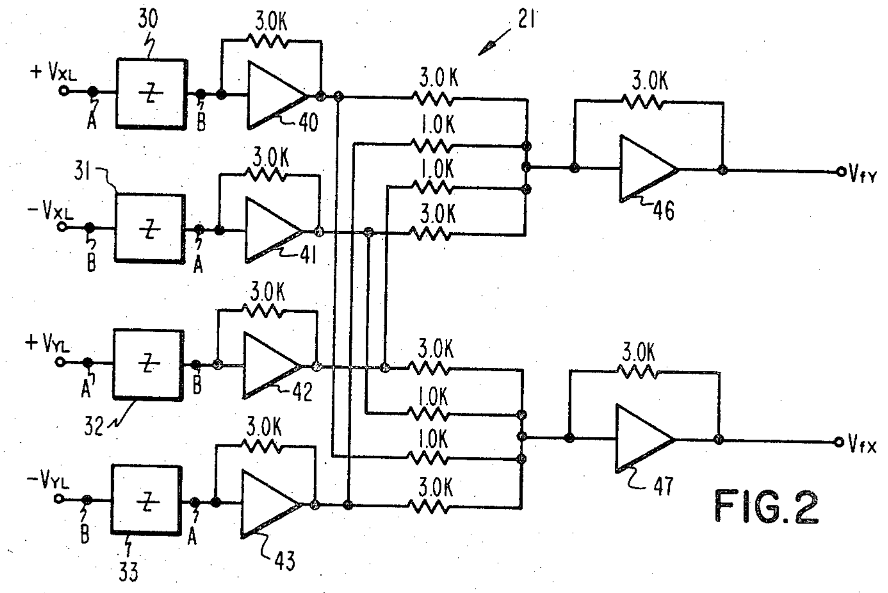
FIG. 2 is a schematic circuit diagram of the micro pincushion correction circuit shown in block form in FIG. 1.
Figure 3:
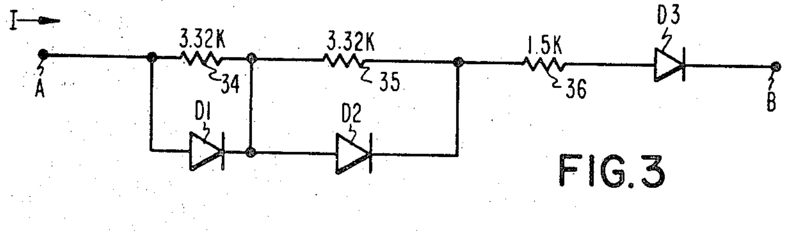
FIG. 3 is a circuit diagram of the components connected together to form the non-linear resistor shown in block form in FIG. 2.

The micro pincushion correction circuit 21, FIG. 2, basically consists of operational amplifiers, precision resistors, and non-linear resistors. The signals $+V_{XL}$, $-V_{XL}$, $+V_{YL}$ and $-V_{YL}$ are applied to inputs of non-linear resistors shown in block form as blocks 30, 31, 32 and 33 respectively. These non-linear resistors each are of the same form. A typical non-linear resistor is shown in FIG. 3 as being constructed from linear components including resistors 34, 35 and 36 connected in series. Diodes D1 and D2 are connected in parallel with resistors 34 and 35 respectively. Diode D3 is connected in series with resistor 36. These components are selected such that the current through a resistor is proportional to the square of the voltage across the resistor. Again referring to FIG. 2, the outputs of the non-linear resistors 30, 31, 32 and 33 are connected to inputs of operational amplifiers 40, 41, 42 and 43 respectively. The output of operational amplifier 40 is proportional to the square of the voltage $V_{XL}$ whenever $V_{XL}$ is greater than zero. For all other conditions, the output of amplifier 40 is zero. The output of amplifier 41 is proportional to the square of $V_{XL}$ whenever $V_{XL}$ is less than zero and is equal to zero for all other conditions. The outputs of amplifiers 42 and 43 are similarly related to the square of $V_{YL}$. The outputs of amplifiers 40, 41, 42 and 43 are appropriately weighted and applied as inputs to operational amplifiers 46 and 47. The outputs of operational amplifiers 46 and 47 are the correction voltages $V_{fY}$ and $V_{fX}$ which are applied to ramp generators 17 and 18 respectively.

Figure 4:
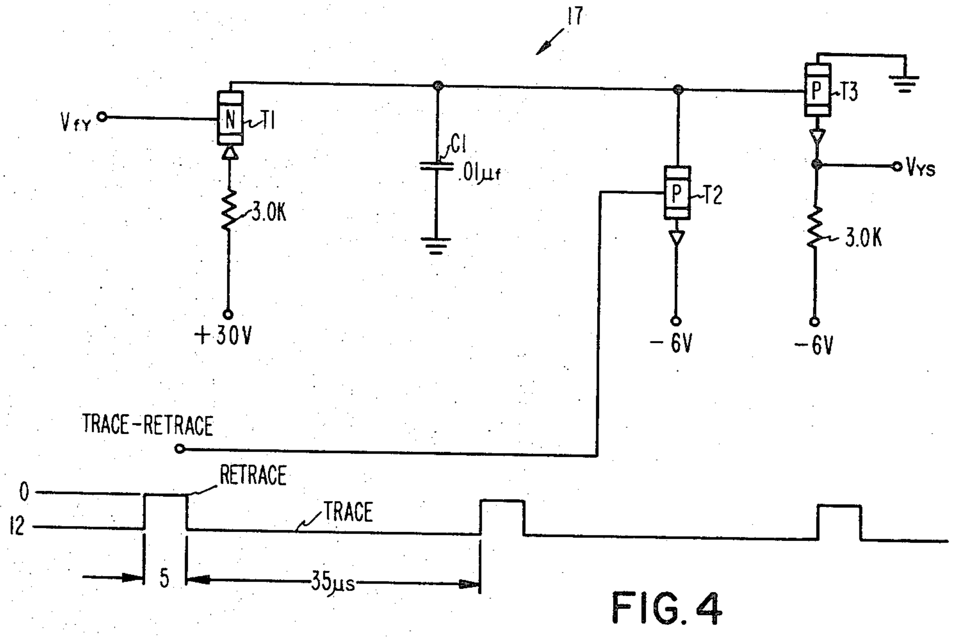
FIG. 4 is a circuit diagram illustrating the micro vertical ramp generator.

The micro vertical ramp circuit 17 is shown in detail in FIG. 4. The $V_{fY}$ signal from pincushion correction circuit 21 is applied to the base of transistor T1 which is normally biased in the on state to provide approximately 10 ma. of current to charge the 0.1 microfarad capacitor C1 in the positive going direction. The trace-retrace signal coming from control 10 is applied to the base of transistor T2. During trace time the signal is at a level to hold T2 off. However, during retrace time, T2 turns on and charges capacitor C1 in a negative going direction towards −6 volts, thereby producing a sawtooth wave form.

It is thus seen that capacitor C1 charges positively for 35 microseconds and then charges negatively for 5 microseconds. When the base of transistor T1 is at some potential other than zero volts, the charging current is more or less than 10 milliamps. If the correction voltage $V_{fY}$ is positive, the charging current is reduced and the size of the sawtooth signal $V_{YS}$ is reduced. On the other hand, if $V_{fY}$ is negative, the charging current is increased and the size of the sawtooth $V_{YS}$ is increased. Transistor T3 functions as a buffer output stage to prevent loading on capacitor C1. The output signal $V_{YS}$ is taken from the emitter of transistor T3 and of course, is applied to the input of driver 19 shown in FIG. 1.

Obviously, the small or micro deflection signal would not necessarily have to be a sawtooth wave form. It could also take the form of a sine wave which is used as a small or micro deflection signal in electronic circle curve followers. Further, in the event single horizontal and vertical deflection coils were used, then the output of the horizontal and vertical drivers would be as follows:

$$V_X=(V_{XL}-V_{KX})+V_{XS}$$
$$V_Y=(V_{YL}-V_{KY})+V_{YS}$$

From the foregoing, it is seen that this invention provides both micro and macro pincushion correction for a flying spot scanning system. These particular corrections are particularly advantageous for flying spot scanning systems having separate ramp generators for the small and large deflection signals particularly where the signals differ greatly in frequency content and precision. Further, the use of the separate pincushion correction circuits permits the use of separate deflection yoke drivers if desired.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Distortion correction apparatus for a flying spot scanner comprising:

means for generating large and small beam deflection signals, means for generating large and small distortion correction signals for said large and small beam deflection signals, and means for combining said large deflection signals with said large correction signals and said small deflection signals with said small correction signals to provide corrected large and small deflection signals free of distortion.

2. The apparatus of claim 1 wherein the frequency of said large deflection signal is low compared to the frequency of said small deflection signal.

3. The apparatus of claim 1 wherein said small correction signal is developed from said large deflection signal.

4. The apparatus of claim 1 wherein said small deflection signal and said small correction signal are combined within said means for generating said small deflection signal.

5. The apparatus of claim 1 wherein said large deflection signal includes horizontal and vertical components $V_{XL}$ and $V_{YL}$ respectively, and the small correction signal includes horizontal and vertical correction signals $V_{fX}$ and $V_{fY}$ where $V_{fX}$ equals $3V_{XL}^2+V_{YL}^2$ and $V_{fY}$ equals $V_{XL}^2+3V_{YL}^2$.

6. Distortion correction apparatus for a flying spot scanner comprising:

a first horizontal ramp generator for generating large horizontal deflection signals, a first vertical ramp generator for generating large vertical deflection signals, a macro pincushion correction circuit having inputs connected to said first horizontal and vertical ramp generators and operative to develop first horizontal and vertical distortion correction signals, a second horizontal ramp generator for generating small horizontal deflection signals, a second vertical ramp generator for generating small vertical deflection signals, and a micro pincushion correction circuit having inputs connected to the outputs of said first horizontal and vertical deflection signal generators and operative to generate micro horizontal and vertical correction signals.

7. The apparatus of claim 6 wherein said micro horizontal and vertical correction signals are applied directly to said second horizontal and vertical ramp generators respectively to cause the same to generate corrected small horizontal and vertical deflection signals.

References Cited

UNITED STATES PATENTS

| | | | |
|---|---|---|---|
| 2,831,145 | 4/1958 | Albert et al. | 315—24 |
| 3,309,560 | 3/1967 | Popodi | 315—24 |

RODNEY D. BENNETT, *Primary Examiner.*

R. E. BERGER, *Assistant Examiner.*